Feb. 1, 1927.
U. A. SHIREY
1,616,283
CORN GATHERER AND HUSKER
Filed May 14, 1924      4 Sheets-Sheet 1
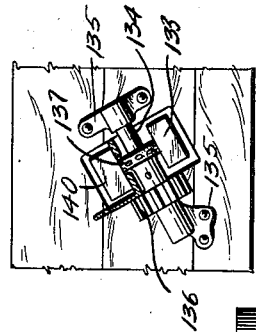
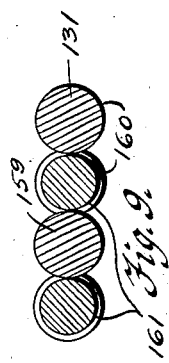
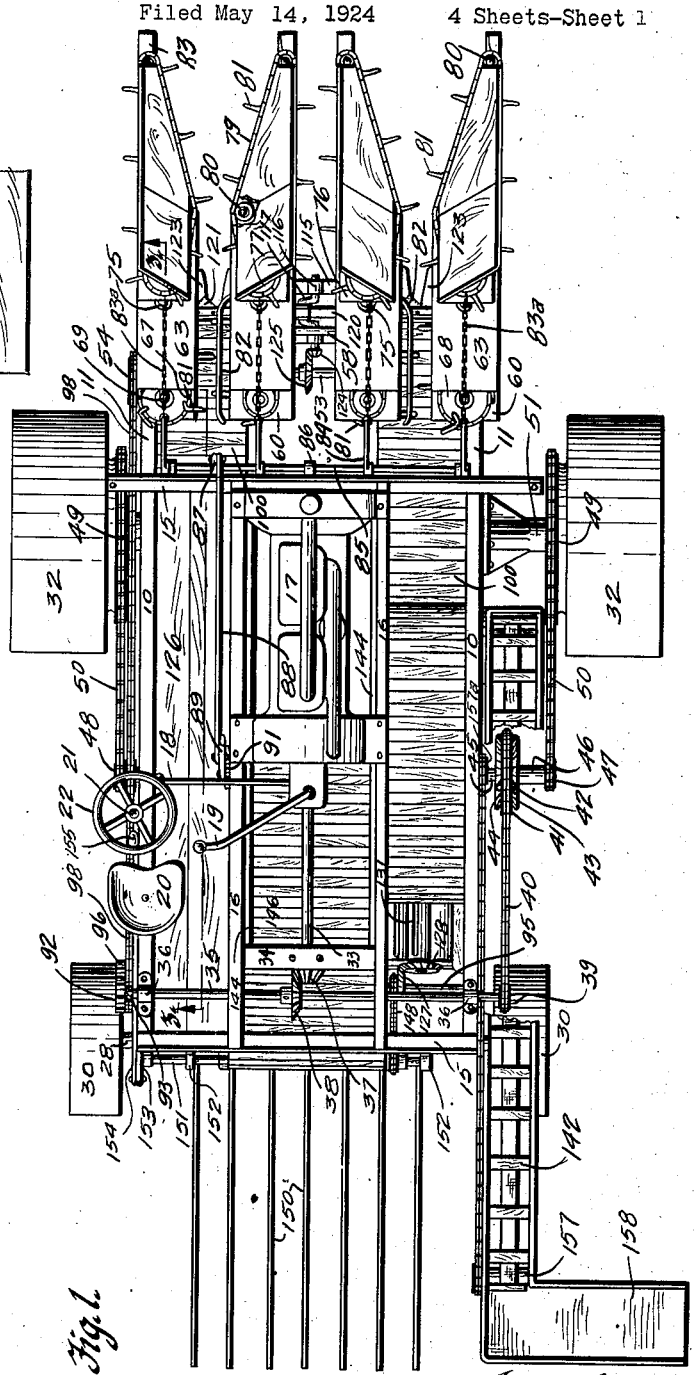
Witness
Inventor
Ulyssis A. Shirey
by Bair & Freeman Attys.

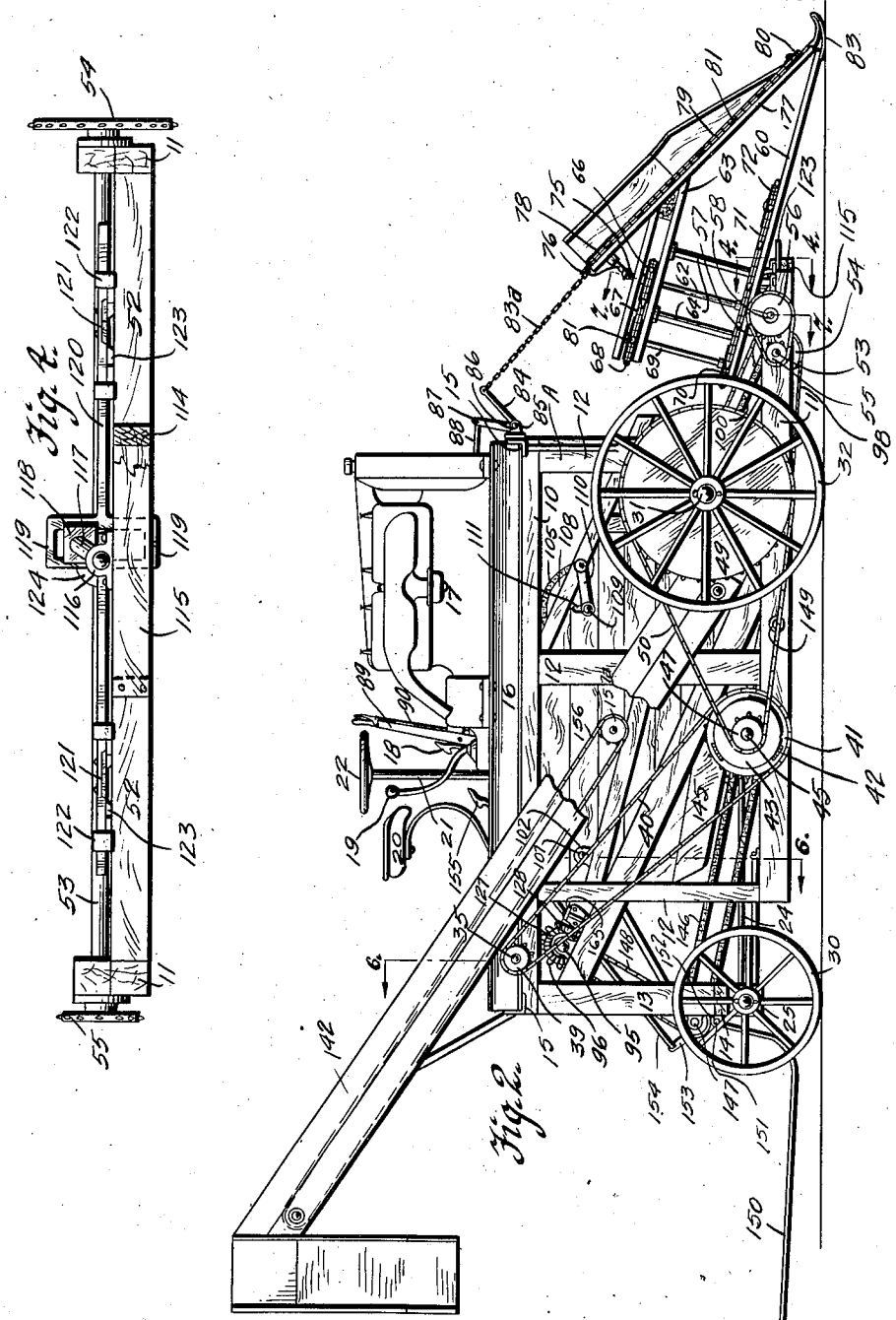

Feb. 1, 1927. 1,616,283
U. A. SHIREY
CORN GATHERER AND HUSKER
Filed May 14, 1924 4 Sheets-Sheet 3
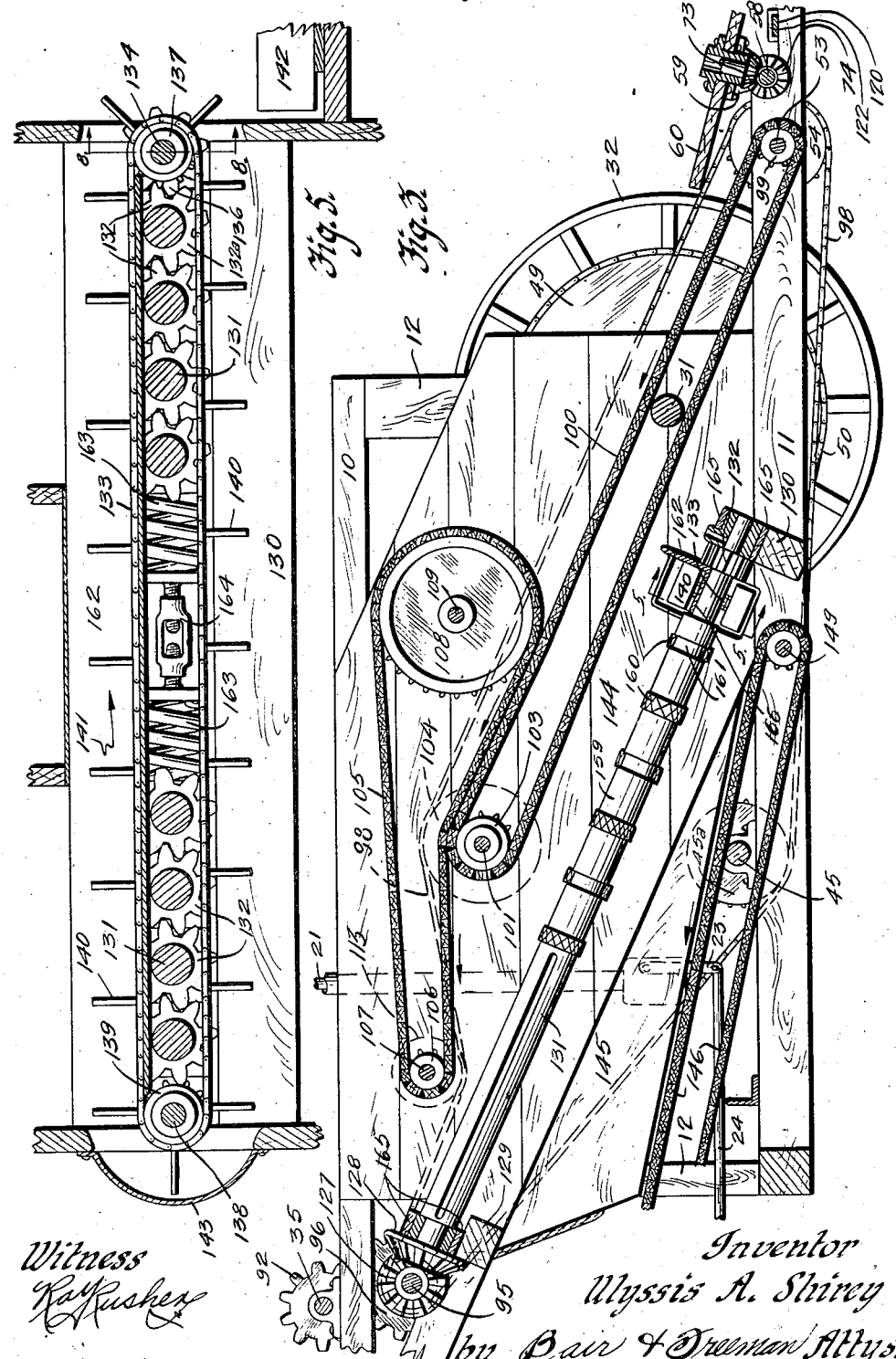
Witness
Ray Rusher
Inventor
Ulyssis A. Shirey
by Bair & Freeman Attys.

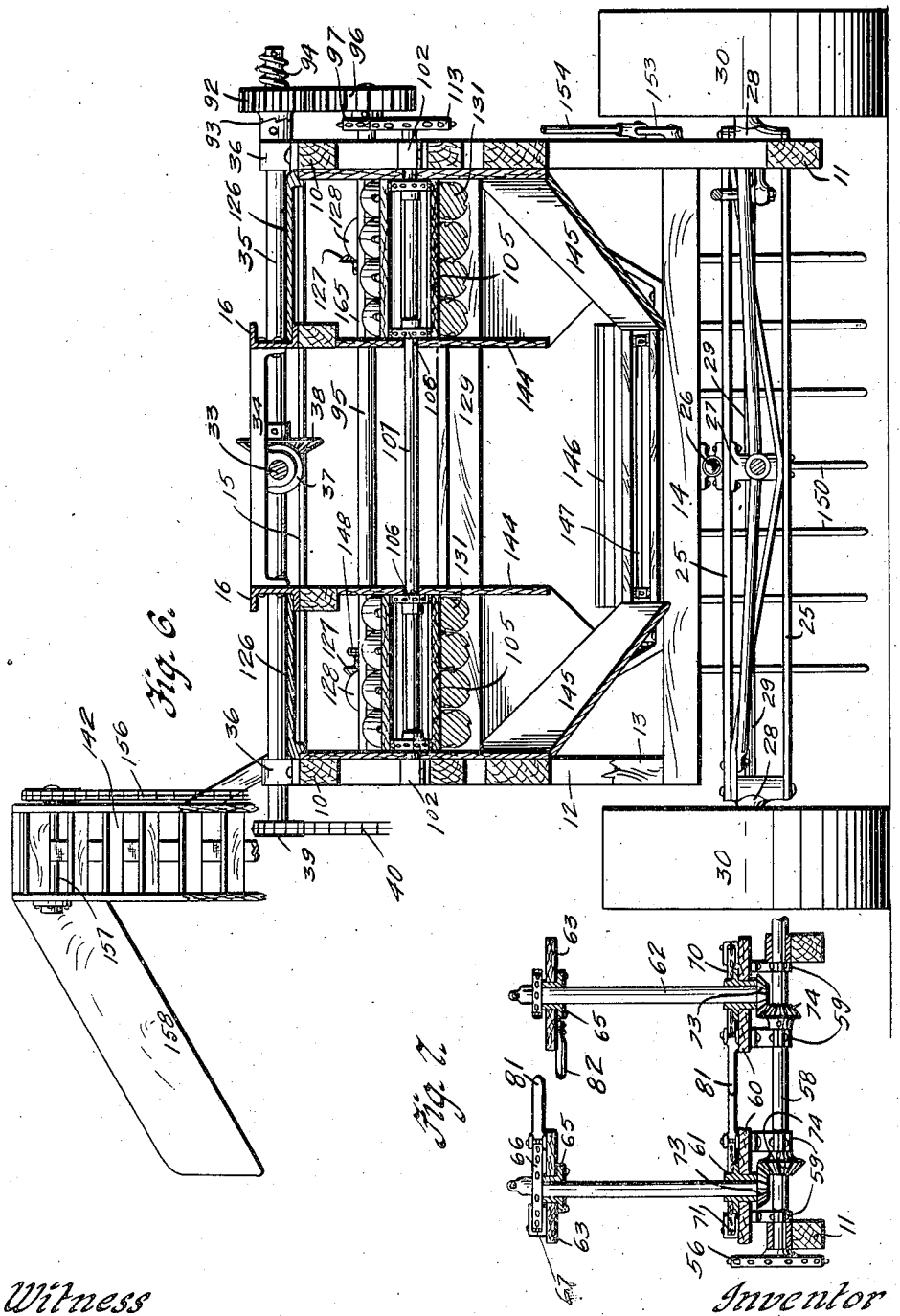

Patented Feb. 1, 1927.

1,616,283

UNITED STATES PATENT OFFICE.

ULYSSIS A. SHIREY, OF DES MOINES, IOWA, ASSIGNOR OF ONE-HALF TO VICTOR BERGLUND, OF DES MOINES, IOWA.

CORN GATHERER AND HUSKER.

Application filed May 14, 1924. Serial No. 713,349.

The object of my invention is to provide a corn gatherer and husker of comparatively simple and durable construction whereby it can be manufactured and marketed at a comparatively low cost.

Still a further object is to provide a corn gatherer and husker adapted to be driven by an engine, which also serves as a source of power for driving the gathering mechanisms as well as the husking mechanism.

Still a further object is to provide a gatherer and husker having a carrier thereon adapted to receive the corn stalks and capable of being tripped at various intervals for placing the stalks in windrows over the field.

Still a further object is to provide corn gathering mechanisms adapted to gather the corn of two rows and capable of being raised or lowered so as to be rendered operative or inoperative as desired.

Still a further object is to provide conveyor devices adapted to convey the stalks of corn butt end first to snapping rolls where the ears of corn will be snapped therefrom and then permitted to pass down on the snapping rolls to husking devices, where the husks will be torn from the ear of corn.

Still a further object is to provide a conveyor member for receiving the stalks of corn after the ears have been taken therefrom for conveying them to the bundle carrier, where they can be tripped for dropping them on to the field.

Still a further object is to provide a corn gatherer and husker capable of being backed up and when backed up, the corn gathering mechanism as well as the other mechanism of the machine will remain idle while the traction wheels of the corn harvester will operate.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top plan view of my improved corn gatherer and husker, parts being broken away to better illustrate the construction thereof.

Figure 2 is a side elevation showing the right hand side of the machine.

Figure 3 is a sectional view taken on line 3—3 of Figure 1.

Figure 4 is a detail, sectional view taken on line 4—4 of Figure 2 showing the cutter blades for cutting the stalks of corn.

Figure 5 is a detail, sectional view taken on line 5—5 of Figure 3 showing the cross conveyor and the lower ends of the husking rolls.

Figure 6 is a vertical, sectional view taken on line 6—6 of Figure 2.

Figure 7 is a detail, sectional view taken on line 7—7 of Figure 2, showing the driving connections for the corn gathering mechanism.

Figure 8 is a detail, sectional view taken on line 8—8 of Figure 5, showing the driving shaft and drive for the cross conveyors; and Figure 9 is a detail, sectional view taken through the husking rolls showing the shredding members thereon.

In the accompanying drawings, I have used the reference character A to indicate generally a frame. The frame A includes a pair of spaced, horizontal, upper bars 10 and spaced horizontal lower bars 11. The upper and lower bars 10 and 11 are connected together by uprights 12.

The upper bars 10 are somewhat longer than the lower bars 11 and have their rear ends projecting out beyond the rear ends of the lower bars 11 and have connected thereto a pair of spaced uprights 13.

The lower ends of the spaced uprights 13 are connected together by a cross piece 14. The ends of the upper bars 10 are connected together by cross braces 15, which are in the form of angle iron bars.

The lower bars 11 extend forwardly somewhat of the most forward upright 12, as clearly shown in Figure 2 of the drawings. The purpose of having the lower bars 11 project forwardly of the front upright 12 will be hereinafter more fully set forth.

Mounted upon the cross pieces 15 and spaced inwardly from each of the upper bars 10 are the motor supporting beams 16.

An engine 17 sets upon the supporting beams 16 and is controlled by a suitable clutch control pedal 18 and a gear shifter 19.

Mounted on the upper bar 10 and on the left hand side of the machine is the driver's seat 20.

A steering shaft 21 is mounted on the side of the machine and has a steering wheel 22 arranged adjacent the driver's seat 20. The steering shaft 21 is operatively connected to a steering arm 23 in any suitable manner. The lower end of the steering arm 23 in turn has connected thereto, the steering link 24.

A rear axle 25 is connected to the cross piece 14 at the center thereof by a rocker bolt 26, whereby slight swinging movement of the axle 25 may be had relative to the rest of the machine. The axle 25 consists of a pair of spaced rods arranged with a center truss rod connected thereto for forming the complete axle.

The spaced rods of the axle 25 have a supporting bearing 27 at the center thereof, which is substantially in line with the rocker bolt 26. The axle 25 has steering wheel spindles 28 pivotally connected thereto for permitting movement of the spindles 28. The two spindles at the ends of the axle 25 are connected together by a tie rod 29.

On the outer ends of the spindles 28 are mounted the steerable wheels 30.

A front axle 31 is mounted in the forward end of the frame A and has a pair of traction wheels 32 loosely mounted thereon. The traction wheels 32 are connected to the engine 17 as will now be described.

A main driving shaft 33 extends from the motor engine 17 rearwardly and is supported in a suitable bearing suspended from the short cross piece 34.

A transverse shaft 35 is mounted in bearings 36 which are positioned on the upper bars 10. The transverse shaft 35 extends through the supporting beams 16.

The shaft 33 has a bevel gear 37 fixed thereto in mesh with a bevel gear 38 mounted on the transverse shaft 35.

On one end of the shaft 35 is a sprocket wheel 39 having a sprocket chain 40 extending therearound. The sprocket chain 40 is connected to a differential structure 41, which includes a central sprocket having several small gears 42 mounted therein, in mesh with gears 43 and 44. The entire differential structure is mounted on a transverse shaft 45.

The gear 43 is fixed to the shaft 45 and the gear 43 has a sleeve 46 fixed thereto, which sleeve is loosely mounted on the shaft 45.

A small sprocket gear 47 is connected to the sleeve 46 and is driven from the gear 43.

On the end of the shaft 45 opposite the differential structure 41 is a small sprocket gear 48 which is the same size as the gear 47. The traction wheels 32 have fixed thereto an enlarged sprocket gear 49 connected to the gears 47 and 48 by sprocket chains 50.

A large bearing 51 is fixed to the frame A and serves to support one end of the axle 31 and also prevents any movement of the wheel 32 resting adjacent thereto toward the frame A.

From the construction of the parts just described, it will be seen that traction power is applied to the wheels 32 from the engine 17.

Corn gathering mechanisms are mounted on the forward end of the frame A on the lower bars 11, as will now be described.

The forward ends of the lower bars 11 are connected together by a cross brace 52.

Mounted in the lower bars 11 is a transverse shaft 53 having a sprocket gear 54 on one of its ends. The shaft 53 is driven from the engine as will hereinafter be more fully set forth.

On the free end of the shaft 53, opposite the gear 54, is a small sprocket 55 operatively connected to a sprocket 56 by means of a chain 57. The sprocket 56 is fixed to a shaft 58, which is journalled in the lower bars 11 of the frame A.

Bearings 59 are loosely mounted upon the shaft 58 and have plates 60 secured thereto. The plates 60 in turn have bearings 61 projecting therethrough, in which are mounted shafts 62.

A second plate 63 is positioned above the plates 60 and connected thereto by spacer rods 64.

The upper ends of the shafts 62 extend through bearings 65 mounted on the upper plate 63.

A sprocket wheel 66 is fixed to the upper end of the shafts 62 and has a chain 67 extending therearound.

The chain 67 is operatively connected to a gear 68 for driving a shaft 69. The shaft 69 is journalled in bearings formed in the plates 60 and 63 and has a sprocket gear 70 resting upon the plate 60.

A chain 71 extends around the sprocket gear 70 and also around a sprocket gear 72 fixed to the plate 60 near the forward lower end thereof.

From the construction of the parts just described, it will be seen that the chain 71 is driven through the medium of the shafts 62, the chain 67 and the shaft 69.

The shafts 62 are in turn driven from the shaft 58 by bevel gears 73 and 74. The bevel gears 73 are fixed to the shafts 62 and all of the bevel gears 74 are fixed to the shaft 58.

The upper ends of the shafts 62 have connected thereto a universal joint 75, with which are connected the short shafts 76. The short shafts 76 extend through inclined plates 77 and have connected to their upper ends sprocket gears 78. Each of the gears 78 have a sprocket chain 79 extending therearound, which travels around idlers 80.

The chains 71 and 79 each have outwardly extending fingers 81 which are adapted to engage the stalk of corn as the machine advances forwardly.

Fixed to the two inner sections of the corn gathering mechanisms on the plates 63 are the guide rods 82, which tend to force the stalks of corn toward the outer sections of the gathering mechanisms.

The entire corn gathering mechanism is capable of being swung on the shaft 58 as an axis for raising or lowering it as desired.

The lower, forward ends of the gathering mechanism has runners or shoes 83 thereon, as clearly shown in Figures 1 and 2 of the drawings.

Each section of the corn gathering mechanism has flexible elements or chains 83ª secured thereto, which in turn are connected to crank arms 84 fixed to a shaft 85. The shaft 85 is mounted in suitable bearings 86 fixed to the forward cross braces 15.

A crank arm 87 is also connected to the shaft 85 and has a link 88 pivotally connected to its upper free end.

The link 88 extends rearwardly from the crank arm 87, and is pivotally connected to a control lever 89. The control lever 89 is pivoted to one of the supporting beams 16 and may be locked in any adjusted position by means of the pawl 90 coacting with the notched sector 91.

From the construction of the parts just described, it will be seen that all of the corn gathering mechanism may be elevated or raised so as to be rendered inoperative by the driver of the harvester from the driving seat of the machine.

The shaft 35 has a gear 92 loosely mounted thereon and capable of being fixed thereto by coacting ratchet members 93.

A coil spring 94 on the shaft 35 retains the gear 92 in position so that the coacting ratchet members are engaged and the gear 92 rotated with the rotation of the shaft 35, at least when it moves in one direction.

A shaft 95 is journalled in the frame A in suitable bearings and has a gear 96. On the shaft 95 adjacent the gear 96, I mount a sprocket gear 97.

The sprocket gear 97 has a chain 98 extending therearound. The chain 98 also extends around the gear 54 on the shaft 53.

The chain 98 drives all of the mechanism of the gatherer and husker from the sprocket 97 on the shaft 95, as will more fully appear.

The chain 98 travels around an idler sprocket 45ª loosely mounted on the shaft 45.

Mounted on the shaft 53 are pairs of sprocket gears 99 adapted to have endless conveyors 100 operate therearound.

It may be mentioned that one set of endless conveyors 100 are used for each row of corn gathering, and that the conveyors are positioned with their forward ends adjacent each unit of the corn gathering mechanism.

A transverse shaft 101 is suitably mounted in bearings 102 on the frame A and has pairs of spaced sprocket gears 103 thereon. The endless conveyors 100 have their upper ends travelling around the sprocket gears 103.

One of the ends of the shaft 101 projects out beyond the side of the harvester and has a sprocket gear 104 fixed thereto. The sprocket gear 104 is substantially in line with the sprocket gear 97 on the shaft 95.

The chain 98 extends around the sprocket gear 104 as clearly shown in dotted lines in Figure 3 of the drawings.

It will, therefore, be seen that the endless conveyors 100 are driven at each end by the shafts 53 and 101 operating from the chain 98.

Operating in conjunction with each of the endless conveyors 100 is a conveyor 105. The conveyors 105 have their rear ends travelling around sprockets 106 mounted on a transverse shaft 107.

The shaft 107 is mounted in suitable bearings secured to the frame A.

The forward ends of the conveyors 105 travel around sprockets 108 mounted on a shaft 109. The shaft 109 is a floating shaft and capable of some up and down movement.

In order to permit up and down movement of the shaft 109, which will cause the forward ends of the endless conveyors 105 to also move up and down, I provide links 110 which are pivotally connected to the shaft 109 and to the frame A at their other ends.

The shafts 109 extend through slots 111 formed in the wall 112 of the harvester frame A.

The purpose of permitting up and down movement of the forward ends of the conveyors 105 will be more fully set forth.

The shaft 107 is driven by the sprocket chain 98 through a sprocket gear 113 mounted on one end of the shaft 107 and shown in dotted lines in Figure 3 of the drawings.

Mounted on the cross brace 52 are a pair of forwardly extending supports 114, which have fixed thereto, a short cross piece 115. The cross brace 52 and the cross piece 115 each have bearings 116 mounted thereon, in which is journalled a crank shaft 117.

A block 118 is mounted on the crank shaft 117 and is slidably mounted in a rectangular guide 119. Fixed to the guide 119 and extending outwardly therefrom in opposite directions are the cutter bars 120, which have cutter blades 121 mounted thereon. The cutter bars 120 pass through guides 122, which are secured to the cross brace 52 and extend slightly forwardly therefrom, which is necessary due to the fact that the bars 120 are positioned forwardly of the cross brace 52.

The cutter blades 121 are so positioned that they come between the two parts of each of the corn gathering mechanisms and operate upon a bifurcated plate 123, which forms one part of the cutter wherein the stalk of corn is sheared by the cutter blade 121 and the plate 123.

The plate 123 is mounted upon the cross brace 52 and extends forwardly therefrom.

The crank shaft 117 has a bevel gear 124 fixed thereon on one end in mesh with a bevel gear 125 fixed to the shaft 53, as clearly shown in the drawings.

From the construction of the parts just described, it will be seen that rotation of the shaft 53 will impart a reciprocating movement to the cutting bars 120 due to the fact that the block 118 will slide up and down within the guide 119 as the crank shaft 117 rotates.

The top of the harvester is provided with cover plates 126, which are positioned above the husking rolls and the elevating devices which serve as guards for preventing any possibility of injury to the driver of the harvester, and in Figure 1, I have shown one of the cover plates 126 removed for showing the conveyors therebelow.

The shaft 95 has fixed to it a pair of bevel gears 127 which mesh with bevel gears 128.

Mounted in suitable bearings on the cross braces 129 and 130 are husking and snapping rolls 131. One of the husking rolls 131, on each set on each side of the harvester, has the bevel gear 128 fixed thereto. On the opposite ends of the husking rolls 131 from the gear 128 are mounted meshing pinions 132. The husking rolls 131 having the gears 128 thereon transmit rotation from the shaft 95 to all of the husking rolls 131 through the pinions 132.

A cross conveyor 133 is operatively driven from one of the pinions 132. A cross conveyor shaft 134 is mounted in bearings 135 on one of the walls of the frame A, as clearly shown in Figure 8 of the drawings.

The shaft 134 has a pinion 136 fixed thereto, which is in mesh with the end pinion referred to by the reference numeral 132ᵃ.

The shaft 134 has a sprocket 137 thereon, around which the cross conveyor 133 travels. A shaft 138 supports the sprocket 139 for the opposite end of the cross conveyor 133. The cross conveyor 133 is provided with a number of carrier fingers or plates 140.

The cross conveyor 133 moves in the direction indicated by the arrow 141 and is designed to carry the ears of corn to the right hand side of the machine and drop them on to an elevating conveyor 142.

A cover or guard 143 is mounted on one of the walls of the frame A for protecting one end of the cross conveyor 133, as clearly shown in Figure 5 of the drawings.

A pair of central, spaced wall members 144 separate each of the sets of husking and shredding rolls 131.

Inclined walls 145 are positioned below the husking rolls for forming a hopper or chute wherein the stalks of corn will be forced by gravity and move toward the center of the machine where they will be discharged on to a conveyor 146. The conveyor 146 is driven from the shaft 147 which has a sprocket gear thereon with a sprocket chain 148 travelling around a sprocket mounted on the shaft 95. The forward end of the conveying members 146 is mounted on a shaft 149.

It will be noted that the conveyor 146 is positioned substantially at the center of the machine and between the inclined walls 145. The stalks of corn are carried by the conveyor 146 and are discharged on to the corn stalk carrier and tripper 150.

The corn stalk carrier 150 is fixed to a shaft 151 mounted in suitable bearings 152.

A crank arm 153 on the shaft 151 has a link 154 connected thereto, which is controlled by a foot control pedal 155. When the pedal 155 is moved, it will cause the carrier 150 to move downwardly for permitting the corn stalks thereon to be slid therefrom.

The elevator 142 is driven from the shaft 101 by means of the chain 156, which drives the elevator shaft 157. The shaft 101 has a sprocket on one of its ends 157ᵃ which drives the chain 156.

An ordinary inclined chute 158 is mounted at the upper end of the elevator 142 wherein the ears of corn may be discharged into a wagon or truck.

The stalks of corn are conveyed, butt end first on to the husking rolls 131, and pass between the husking rolls 131 near the upper ends thereof, and then drop on to the conveyor 146.

The ears of corn are snapped from the stalks and then slide down rolls 131 and come in contact with the huskers 159 wherein the husks are separated from the ear of corn. The shredders 159 consist of enlarged rings 160, which fit into grooves 161 formed in the adjacent row 131.

The enlarged portions 160 and the grooves 161 are alternately arranged on the rolls 131. The ears of corn will then pass downwardly on to the cross conveyor 132 and will be prevented from sliding therefrom by the wall 162 at the lower end of the cross conveyor 133.

It will be understood that when the stalks of corn pass through the husking rolls 131, it is necessary to provide some give between the rolls and in order to do so, I provide a pair of coil springs 163 which can be tightened by the turn buckle 164 for forcing the sets of husking rolls 131 against each other.

The springs 163 and turn buckle 164 are positioned both at the upper and lower ends of the husking rolls 131. The upper and lower ends of the husking rolls 131 have their bearings slidably mounted between guides 165.

The springs 163 and the turn buckle devices 164 are also mounted between the guides 165.

The cross conveyor 133 has a support 166, which is formed integral with the wall 162. The lower ends of the husking rolls 131 travel between the top and bottom of cross conveyors 133, and the bottom 166 rests substantially upon the shafts of the husking rolls, as clearly shown in Figures 3 and 5 of the drawings.

The practical operation of my harvester in the harvesting of two rows of corn is as follows.

As the machine advances forwardly over the field, the gathering mechanism for each row of corn receives the stalk between the fingers 81 on the upper and lower sets of chains on each gathering mechanism.

As the machine advances, the stalk of corn is finally received between the bifurcated plates 123 and then are cut by the reciprocating cutters 121. The stalk of corn will remain in upright position due to the guide rod 82, and the fingers 81 on the opposite set of chains.

The butt end of the stalks of corn for each row will rest upon one of the endless conveyors 100, and will travel upwardly on the top of the conveyor butt end first. The stalk of corn will travel between the endless conveyors 105 and the conveyor 100.

As the stalk of corn reaches the upper end of the conveyor 100, it will pass against the under side and be directed, butt end first against the rolls 131. The stalk of corn will then pass through the rolls and, of course, the ear of corn will be snapped therefrom. The forward end of the endless conveyor 105 is loosely mounted so as to be capable of some up and down movement to accommodate the corn stalks between the conveyors 100 and 105, without crushing them.

The slots 111 and the links 110 hereinbefore referred to, permit the up and down movement of the forward end of the conveyor 105, as hereinbefore stated.

After the stalks of corn have passed between the rolls 131, they will drop on to the side walls 145 and will, by gravity slide down on to the conveyor 146. The conveyor 146 carries the corn stalks rearward and discharges them on to the carrier 150.

The carrier 150 is controlled by the driver from a foot control pedal 155 so that at various intervals, the driver may drop the entire number of corn stalks on the carrier into bundles or piles on the field from windrows.

The ear of corn with the husks thereon will pass downwardly on the inclined husking and snapping rolls 131, and when it reaches the lower half of the rolls 131, the husks thereon will be engaged and torn from the ear of corn itself. The husks will pass through the rolls 131 and travel with the stalks as herein stated.

The ear of corn, when the husks are torn therefrom, will then slide down against the wall 162 and move to one side of the machine by the cross conveyor 133.

The wall 162 and the bottom 166 will retain the ears of corn in position where they will be picked up and carried over to the side of the machine by the conveyor 133. The conveyor 133 discharges the ears of corn into an elevating device 142 where the same is carried forwardly, dumped into a chute 158 from where the ears of corn may be dropped into a wagon box or the like.

When it is desired to move the machine over the field without gathering any corn, then the corn gathering mechanisms on the forward end of the machine may be raised upwardly by the operator upon the pulling of the lever 89 rearwardly.

The machine is steered over the field from the back wheels thereof.

Whenever it is desired to reverse the direction of the machine, then the coacting clutch member 93 on the shaft 35 will operate for disengaging the driving mechanisms for the conveyors and the snapping rolls due to the fact that the moving parts of the machines are operated from the drive shaft 35.

From the foregoing, it will be seen that I have provided a corn gatherer and husker capable of gathering the corn from two rows and that the stalks of corn are cut, and then the ears of corn removed therefrom and finally the stalks again dropped on the field in piles at various intervals.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In a corn gathering and husking machine, a wheel mounted frame, driving means on said frame, corn gathering mechanism mounted on the forward end of said machine, a cutter blade for said gathering mechanism, means for imparting a reciprocating movement to said cutter blade, conveying devices positioned adjacent said gathering mechanism for carrying cut stalks of corn thereon, butt end first, to rolls which are positioned beneath the said conveyor and substantially parallel thereto which have a snapping portion adjacent the end of said conveyor for receiving the stalks therefrom and a husking portion beneath said conveyor, a conveyor device adapted to receive the stalks from the snapping portion of said rolls, a carrier mounted on said machine for receiving the stalks discharged from said last conveyor device, means for tripping said carrier for discharging the stalks therefrom and a cross conveyor at the husking end of the rolls for receiving the ears of corn and carrying them to one side of the machine.

2. In a corn gathering and husking machine, a wheel mounted frame, driving means on said frame, corn gathering mechanisms mounted on the forward end of said machine, means for cutting stalks of corn gathered by said gathering mechanisms, conveying devices positioned adjacent said gathering mechanisms for carrying cut stalks of corn thereon, butt end first, a second conveying device loosely positioned upon said first conveyor device whereby the stalks of corn are permitted to pass therethrough, rolls operatively driven from said first means and positioned at the end of said first conveyor for receiving the stalks of corn, snapping portions for said rolls and husking portions for said rolls extending under said conveyors, and a cross conveyor at the husking end of said rolls for receiving the ears of corn and carrying them to one side of the machine and a corn elevator adapted to receive the corn discharged from said cross conveyor.

3. In a corn gathering and husking machine, a wheel mounted frame, driving means on said frame, corn gathering and cutting mechanism mounted on the forward end thereof, conveying devices positioned adjacent said gathering mechanisms for carrying cut stalks of corn thereon butt end first to rolls positioned below said conveyor, a cross conveyor for removing the husked ears of corn from said rolls, a conveyor under said rolls for removing the stalks of corn and corn husks from said machine.

ULYSSIS A. SHIREY.